(12) United States Patent
Johnson

(10) Patent No.: US 8,576,336 B2
(45) Date of Patent: Nov. 5, 2013

(54) PROGRESSIVE VIDEO REFORMATTING FOR FILM-BASED CONTENT

(75) Inventor: Ronald Douglas Johnson, Westfield, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 0 days.

(21) Appl. No.: 13/514,314

(22) PCT Filed: Dec. 9, 2009

(86) PCT No.: PCT/US2009/006449
§ 371 (c)(1),
(2), (4) Date: Jun. 7, 2012

(87) PCT Pub. No.: WO2011/071465
PCT Pub. Date: Jun. 16, 2011

(65) Prior Publication Data
US 2012/0236200 A1   Sep. 20, 2012

(51) Int. Cl.
*H04N 7/01* (2006.01)
*H04N 11/02* (2006.01)

(52) U.S. Cl.
USPC ........... 348/441; 348/476; 348/477; 348/545; 348/633; 348/634; 345/102

(58) Field of Classification Search
USPC ........... 348/441, 545, 434.1, 435.1, 476, 477, 348/478, 479, 633, 634, 682
See application file for complete search history.

(56) References Cited

U.S. PATENT DOCUMENTS

| | | |
|---|---|---|
| 3,609,019 A | 9/1971 | Tuber |
| 2006/0176261 A1 | 8/2006 | Nitta et al. |
| 2008/0174694 A1 | 7/2008 | Morad et al. |
| 2009/0185795 A1 | 7/2009 | Itani et al. |
| 2009/0243995 A1 | 10/2009 | Kimura |

*Primary Examiner* — Jefferey Harold
*Assistant Examiner* — Omer Khalid
(74) *Attorney, Agent, or Firm* — Robert D. Shedd

(57) ABSTRACT

A video formatter reformats progressive video using a film-based video film rate and a display refresh rate to determine a frame OFF period for a progressive video sequence. The video formatter inserts at least one black frame into the progressive video sequence to approximate the frame OFF period. Typically, the film rate is 24 frames per second (industry standard) and, thus, the display refresh rate can be a multiple of the frame rate (e.g., 96 Hz, 120 Hz, 240 Hz, etc.). Progressive video replicates a single frame of a film several times ("a progressive video sequence") depending on a display's refresh rate. The black frame(s) is/are substituted at the end of this sequence instead of displaying the same image throughout for a single film frame.

17 Claims, 4 Drawing Sheets

PROGRESSIVE VIDEO REFORMATTING FOR FILM-BASED CONTENT

This application claims the benefit, under 35 U.S.C. §365 of International Application PCT/US2009/006449, filed Dec. 9, 2009, which was published in accordance with PCT Article 21(2) on Jun. 16, 2011 in English.

TECHNICAL FIELD

The subject matter relates generally to video, and more particularly to systems and methods for reformatting film-based progressive video.

BACKGROUND

The motion picture industry was born when static pictures were flashed on a screen fast enough that people perceived the image to be moving. The pictures were eventually "taped" together by imprinting the static pictures on a roll of translucent film. This allowed a projector to shine light through each picture and project the image to a screen. By moving the film in front of the projector, each picture was flashed on the screen in sequence, giving the illusion of motion to the audience. Because each of the pictures is "flashed" momentarily, the speed of the flashing is important to reduce flicker. Human vision has a phenomenon known as 'persistence of vision'— that is, the eye retains what it sees even after the picture is removed from sight. The phenomenon is momentary, and, if a motion picture projector is fast enough, the motion appears in focus and does not flicker. It has become a standard in the film industry to use a frame rate (flashes of pictures) of 24 frames (or pictures) per second. This rate works well in lighting controlled environments (persistence of vision is influenced by the amount of ambient lighting).

Modern progressive video does not have a time lag between "flashes" of pictures. The pictures (or images) are continuously shown. This does not allow the human eye to focus on the picture long enough to denote details of the picture before it changes. Essentially, the persistence of vision attempts to retain a previous picture while a new picture is being shown, causing a blurring effect. Thus, progressive video does not appear to have the same quality as when the same video is shown in a motion picture setting. Progressive video effectively reduces the quality and viewing experience of film-based motion pictures (or videos).

SUMMARY

A film rate for film content along with a display refresh rate is utilized to determine a frame OFF period. At least one black frame that approximates the frame OFF period is then inserted into a progressive video sequence to simulate a motion picture projector's flicker. Typically, the film rate is 24 frames per second (industry standard) and, thus, the display refresh rate can be a multiple of the frame rate (e.g., 96 Hz, 120 Hz, 240 Hz, etc.). Progressive video replicates a single frame of a film several times ("a progressive video sequence") depending on a display's refresh rate. The black frame(s) is/are substituted at the end of this sequence instead of displaying the same image throughout for a single film frame. The insertion of the black frame(s) or OFF period allows the viewer's vision time to focus on details of the motion, producing a higher subjective quality of playback for progressive video based on film.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
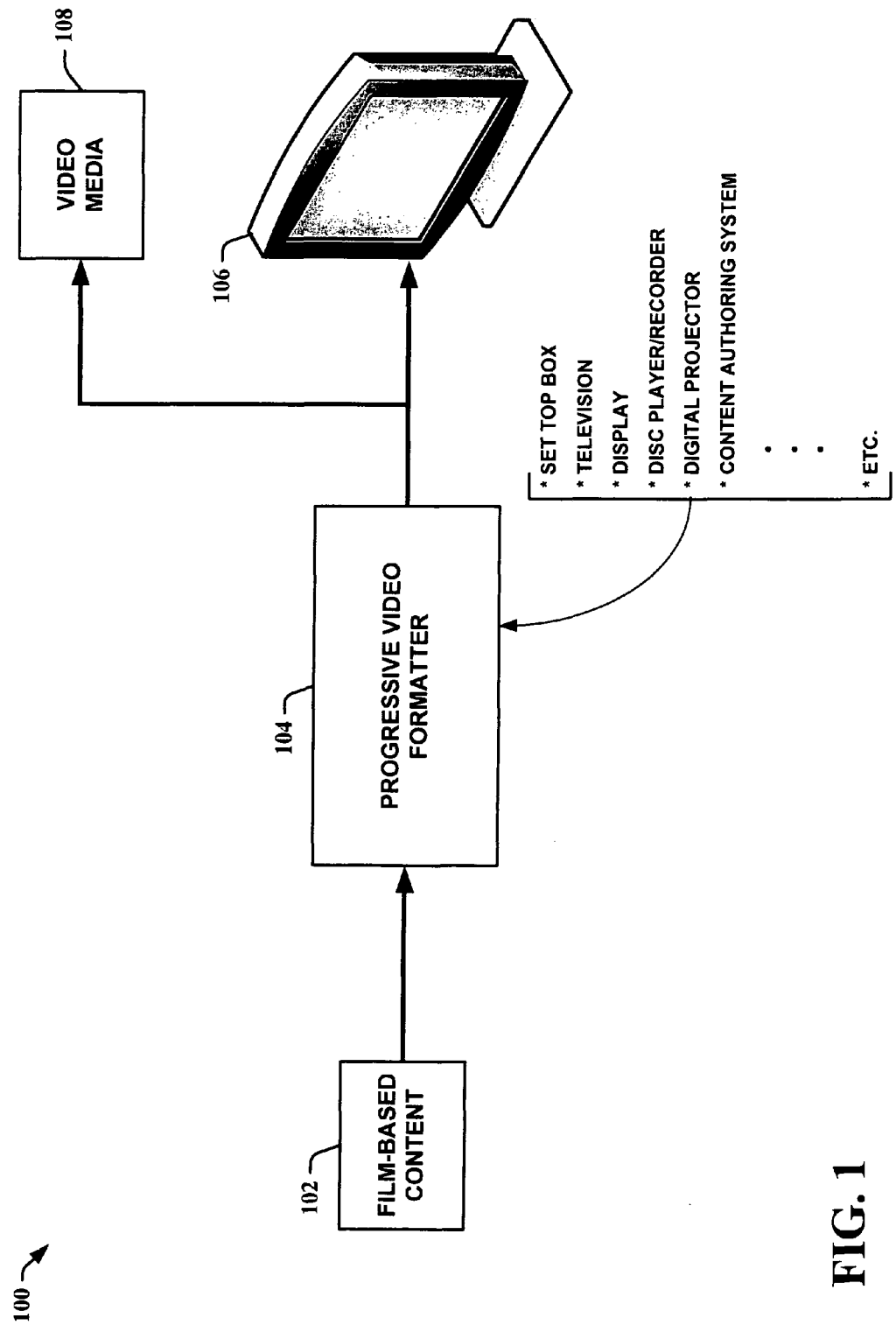
FIG. 1 is a block diagram of a progressive video formatting system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and nonvolatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

FIG. 1 illustrates a system 100 that incorporates a progressive video formatter 104 to reformat film-based content 102 for displaying on a progressive display 106 and/or for storing on video media 108 such as, for example, digital video discs, video compact discs, servers, hard drives, thumb drives, etc. The film-based content 102 is video that originated as content created for film-based movie projectors. This can include, but is not limited to, content created using actual film and/or content created using digital methods or means that emulate such film content and the like. Current industry standards are for film content to include 24 frames for each second. However, the techniques discussed herein are not limited to only 24 fps for film content. It is also applicable to fps greater than or less than 24 fps.

The progressive display 106 can include, but is not limited to, plasma displays, liquid crystal displays (LCD), light emitting diode (LED) displays, OLED displays, and other types of displays and the like. The progressive video formatter 104 can be associated with a set top box, television, display, disc player (DVD and the like), disc recorder (DVD and the like), and/or a digital motion picture projector and the like. It 104 can reside within, on and/or near these systems. Thus, the location between a progressive video formatter 104 and a progressive display 106 can local and/or remote (fragmented implementations can permit both local and remote portions of the progressive video formatter 104). The progressive video formatter 104 can also be used with content authoring systems. These systems are typically used to generate video media content such as DVDs. However, the systems could also generate formatted content for storing on video servers, etc. for video streaming, etc.

Figure 2:
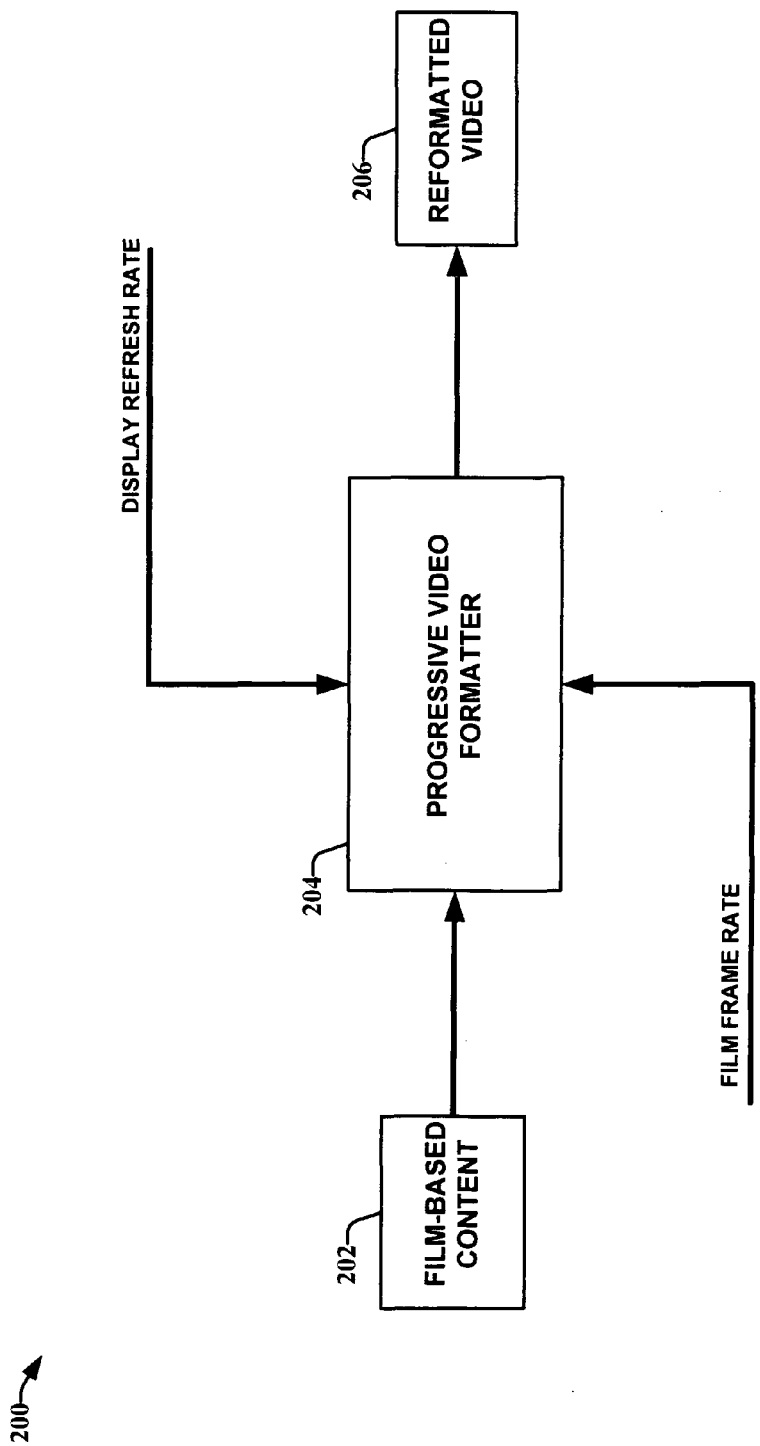
FIG. 2 is another block diagram of a progressive video formatting system in accordance with an aspect of an embodiment.

In FIG. 2, a system 200 utilizes a progressive video formatter 204 with optional inputs for display refresh rate and film rate. The progressive video formatter 204 formats film-based content 202 to provide a reformatted video 206. In one example, the progressive video formatter 204 utilizes the industry standard of 24 fps for the film-based content. Since it is a standard in the industry it is not necessary to have an input for the film frame rate that the film-based content 202 is based upon. However, in other examples, since the progressive video formatter 204 can utilize any film frame rate, an input of the film frame rate can be provided. Similarly, if a display utilized for progressive playback is known by the progressive video formatter 204 (e.g., the progressive video formatter 204 resides within the display itself, etc.), a display refresh rate input is not required. However, in other examples, the progressive video formatter 204 may not know the display refresh rate of a connected display, and, thus, an input for the display refresh rate can be provided. The display refresh rate can be provided by direct user input and/or input provided directly from the display, etc. over wired and/or wireless means and the like. In a content authoring manufacturing system, it is likely that the refresh rate for a particular user's equipment will not be known, but an industry standard may be in place to ensure optimal playback.

By simulating motion picture projector flicker in progressive video, the subjective quality of film originated videos can be improved to a film-like experience. Motion picture projectors shine a light through a film and project the film's image onto a screen. Between each presented frame there is a moment in time where the screen goes black and afterwards the next frame of film is displayed. However, modern video displays have natively progressive output. They compose one full frame multiple times per second. Each frame leads to the next frame without a gap. This intuitively seems to be an accurate way to display the original content.

The moment of time with blackness associated with a motion picture projector is not perceived by the viewer due to a phenomenon called 'persistence of vision.' In a dark room, if an image is flashed ON and OFF at a speed of approximately 24 frames per second, it is perceived as dimmer than the moments the picture is flashed, but no flashing is observed. In bright daylight that flashing rate may need to be as high as 60 frames per second. Minimizing the amount of light needed to project and keeping the flicker rate to a minimum is why movie theaters are kept so dark.

Persistence of vision is motion perception. If a ball is moving across a room really fast, it is perceived as a streak of color. With a progressive display, a ball is perceived as moving as a streak of color, but the original content seen in a movie theater is perceived slightly differently. With the ball moving on a movie theater silver screen, there is a moment of blackness that allows the eye's persistence of vision to de-saturate. The next frame is then projected showing the ball in a new position. The sudden change, though not perceived as a flash or flicker, causes the eye to get a more precise visual image of the ball. The effect is that the ball is moving rapidly across the screen, but more details about the ball are perceived by the viewer. It can also be thought of in terms of a stroboscope effect. The projectors behave just like stroboscopes that have had their speed turned up to the point that the flicker is not perceived, but the motion in that type of lighting would seem very unnatural and "sharp." However, if the film has the right amount of motion blur already in it to perfectly match the stroboscope, the viewer's eyes see things the way the creator of the content intended. Changing the light flashing presentation distorts the effect.

A film's content creator may have intended to have sharp movements in scenes with a lot of action, but progressive displays tend to make rapid movements look more streaky, soft or blurry. Thus, the original intent of the film maker is lost when it is converted to progressive video. By using a high refresh rate display and recreating the momentary flashes, progressive video can be made to look more like the original film content. For example, a 120 Hz refresh rate display has to display the same 24 fps (frames per second) image five times before moving to the next image. To simulate the flicker found in motion picture projectors, the progressive video can be altered on the 120 Hz display to show a ball displayed in one position for four frame times, then one frame time of black, followed by 4 frame times in the next position, then one frame of black, and so on.

Figure 3:
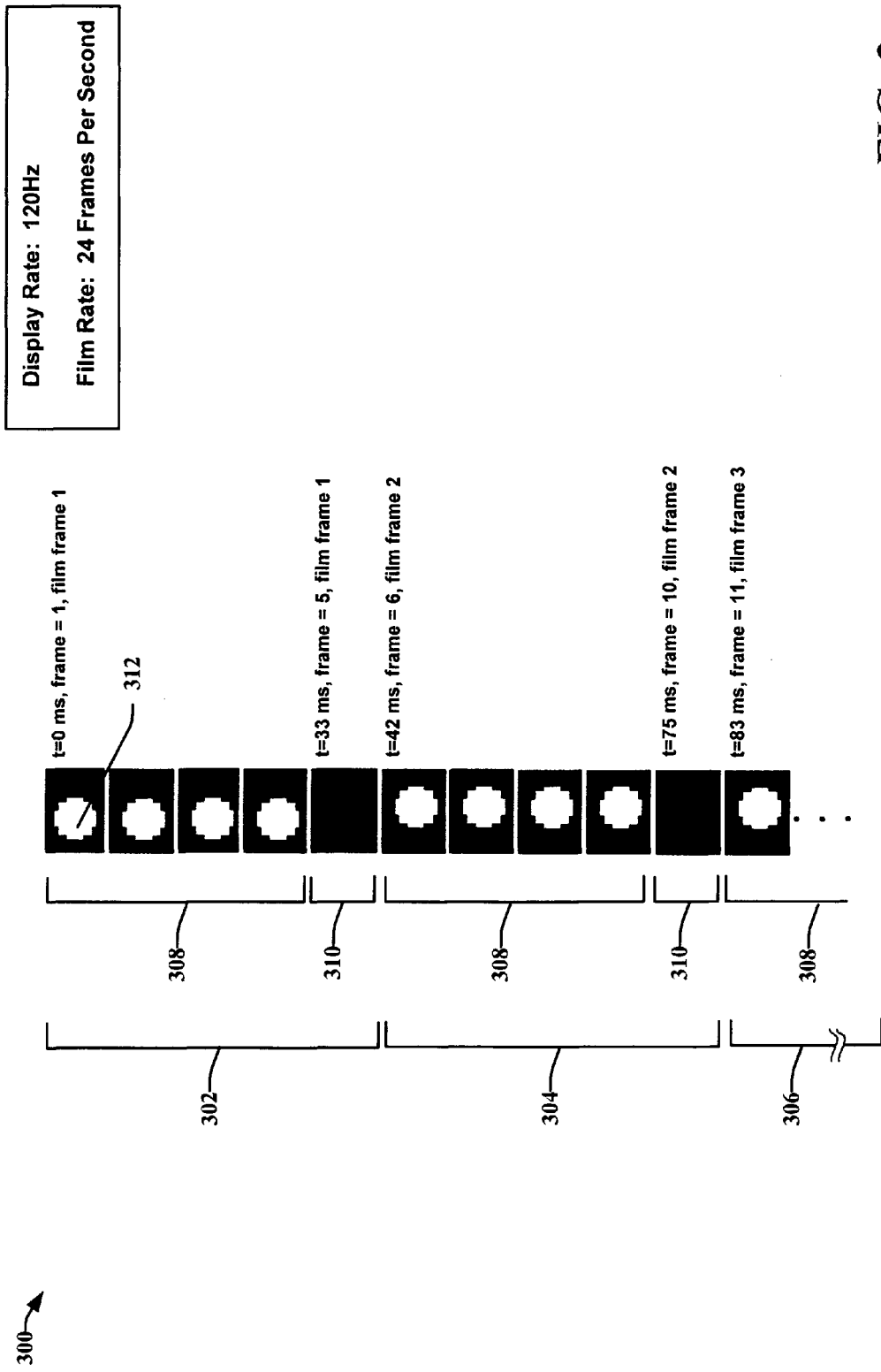
FIG. 3 is an example of reformatting progressive video that is based on film in accordance with an aspect of an embodiment.

In the example 300 illustrated in FIG. 3, a ball 312 is moved from left (film frame 1 of a progressive video sequence) 302 to right (film frame 2 of a progressive video sequence) 304 and then held in place (film frame 3 of a progressive video sequence) 306. The illumination at each step is shown assuming a 24 fps film and a 120 Hz refresh display device. Film frames 1, 2 and 3 of the progressive video sequences now have four images 308 of the film frames replicated in sequence and black frames 310 inserted at the end of each sequence. The end result is that the video is displayed in a very natural way on a progressive video output recreating a visual output that very closely matches the way the content was created and intended to be displayed with a motion picture projector on a movie theater screen. The OFF time is $\frac{1}{5}^{th}$ of the progressive video sequence time (for 24 fps film-based content). The OFF time does not have to be exactly $\frac{1}{5}^{th}$, but this value gives good subjective results when viewing the reformatted film-based content, because it is close to the flicker time found in the original film (at 24 fps). Thus, inserting one black frame in a sequence of five frames gives a good approximation of the original film flicker. The black frame is considered to be the "OFF" time. It can also be appreciated that other means besides insertion of a black frame can be utilized to emulate the OFF period.

One skilled in the art can appreciate that other refresh rates can be used as well. For example, a 96 Hz refresh rate allows for a progressive video sequence of four frames for each film frame. Substituting one black frame for the fourth frame induces flicker into the progressive video sequence (three like frames with one black frame). Thus, a $\frac{1}{4}^{th}$ OFF time provides good subjective viewing results as well. The refresh rate can also be increased. For example, a 240 Hz refresh rate has a progressive video sequence of 10 frames. Approximating the OFF time using $\frac{1}{5}^{th}$, two frames of black can be substituted at the end of the progressive video sequence to simulate projector flicker. If a different film frame rate is used, the OFF time can be adjusted accordingly. A faster film frame rate for the film-based content decreases the OFF time and a slow film frame rate increases the OFF time.

Some movie projectors have shutters that are open for partial amounts of the frame time with bright flashes in between. Older projectors used to flash one time per frame at 24 fps, but now flash two or three times per frame. The effect is the same, but reduces the flicker that some people might be able to see. Given a fast enough and bright enough display, this effect can also be reproduced with the techniques described herein. The fully off period while advancing the frame is still either 25% or 16.66% of the 24 fps period using a 48 Hz and/or 72 Hz example. This is typically why 20% is subjectively recommended as being the "best" technique. Although higher rate shutters in movie projectors reduce the flickering effect, it also is less efficient—requiring a more powerful light source to have the same light on the screen as a low rate shutter version.

In another instance, if the response time of a display (e.g., LCD being very slow) is known, the first of the repeated frames can be overdriven to improve the display's overall response time. If the pattern starts with OFF, then a pixel is displayed, for example, at 75%, but the display is slow, so the pixel is overdriven instead to 100% on the first frame then back to 75% for the second frame presentation of that pixel. LCD displays themselves cannot include this type of optimization because they are not aware of the brightness of the pixel during the next presented frame. Because of their difference in operation, DLP, CRT and plasma TVs would not benefit from this type of optimization.

Figure 4:
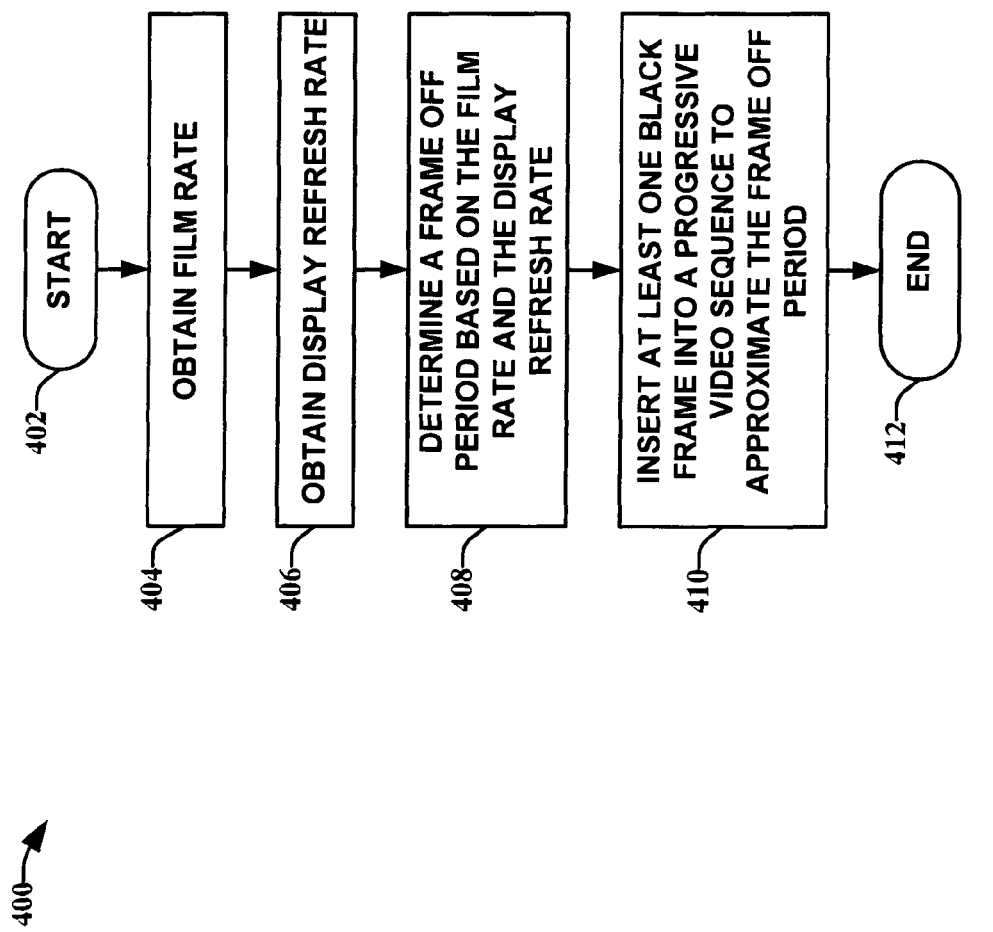
FIG. 4 is a flow diagram of a method of reformatting progressive video in accordance with an aspect of an embodiment.

In view of the exemplary systems shown and described above, methodologies that can be implemented in accordance with the embodiments will be better appreciated with reference to the flow charts of FIG. 4. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

In FIG. 4, a flow diagram of a method 400 of simulating film flicker in progressive video in accordance with an aspect of an embodiment is shown. The method starts 402 by obtaining a film rate for film-based content 404. The film rate can be predetermined (e.g., using the industry standard of 24 fps, etc.), entered by a user, and/or provided by the film-based content itself (content marked externally and/or internally with the film rate) and the like. A display refresh rate is then obtained 406. The display refresh rate can be obtained directly from a display link, entered by a user, and/or predetermined (method 400 implemented within a display and/or associated display is known) and the like. If the method 400 is used in a content authoring system for creating video media, the display refresh rate can be set to an industry standard and the like as well. A frame OFF period is then determined for a progressive video sequence based on the film rate and the display refresh rate 408. The frame OFF period is the OFF period of the progressive video sequence. The time value of the frame OFF period is based approximately on the OFF period of the film rate. The progressive video sequence frame times are predetermined by the display refresh rate, and, thus, may not exactly equate to a multiple of the film rate OFF period. Therefore, the frame OFF period is a multiple of a frame time of the progressive video sequence that best approximates the film rate OFF period. Once the OFF period is determined, at least one black frame (more than one black frame can be required to approximate the frame OFF period) is then inserted into the progressive video display sequence to approximate the frame OFF period 410, ending the flow 410.

It is to be appreciated that the systems and/or methods of the embodiments can be utilized in progressive video reformat facilitating computer components and non-computer related components alike. Some progressive video formatting can be fully and/or partially implemented in software. Further, those skilled in the art will recognize that the systems and/or methods of the embodiments are employable in a vast array of electronic related technologies, including, but not limited to, computers, set top boxes, televisions, monitors, displays, disc players/recorders, digital projectors and/or handheld electronic devices, and the like.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
   a video formatter that reformats progressive video using a film-based content film rate and a display refresh rate to determine a frame OFF period for a progressive video sequence.

2. The system of claim 1, wherein the video formatter inserts at least one black frame into the progressive video sequence to approximate the frame OFF period.

3. The system of claim 1, wherein the display refresh rate is a multiple of the film rate.

4. The system of claim 1, wherein the film-based video frame rate is 24 frames per second.

5. The system of claim 4, wherein the display refresh rate is 120 hertz and one black frame is inserted into the progressive video sequence.

6. The system of claim 1, wherein the video formatter operates in association with at least one of a set top box, television, display, disc player, disc recorder, and digital projector.

7. The system of claim 1, wherein the video formatter is associated with a content authoring system for creating video media.

8. A method, comprising the steps of:
determining a frame OFF period for a progressive video sequence based on a film rate of film content and a display refresh rate of a display that receives a video; and
inserting at least one black frame into the progressive video sequence of the video to approximate the frame OFF period.

9. The method of claim 8 further comprising the step of:
using a display refresh rate that is a multiple of the film rate.

10. The method of claim 8 further comprising the step of:
using, in part, a film rate of 24 frames per second to determine the frame OFF period.

11. The method of claim 10 further comprising the step of:
using, in part, a display refresh rate of 120 hertz to determine the frame OFF period.

12. The method of claim 8 further comprising the step of:
overdriving a first instance of a video sequence frame for each video sequence to compensate for a display's refresh rate.

13. The method of claim 8, wherein the method is associated with at least one of a set top box, television, display, disc player, disc recorder, and digital projector.

14. A method for creating video media employing the method of claim 8.

15. A system, comprising:
means for determining a frame OFF period for a progressive video sequence based on a film rate of film content and a display refresh rate of a display that receives a video; and
means for inserting at least one black frame into the progressive video sequence of the video to approximate the frame OFF period.

16. The system of claim 15, wherein the display refresh rate is a multiple of the film rate.

17. A non-transitory computer readable medium having stored thereon computer executable components of the system of claim 1.

* * * * *